F. A. JOHNSON.
ATTACHMENT FOR CORN PLANTERS.
APPLICATION FILED OCT. 1, 1918.
1,301,134.
Patented Apr. 22, 1919.
2 SHEETS—SHEET 1.
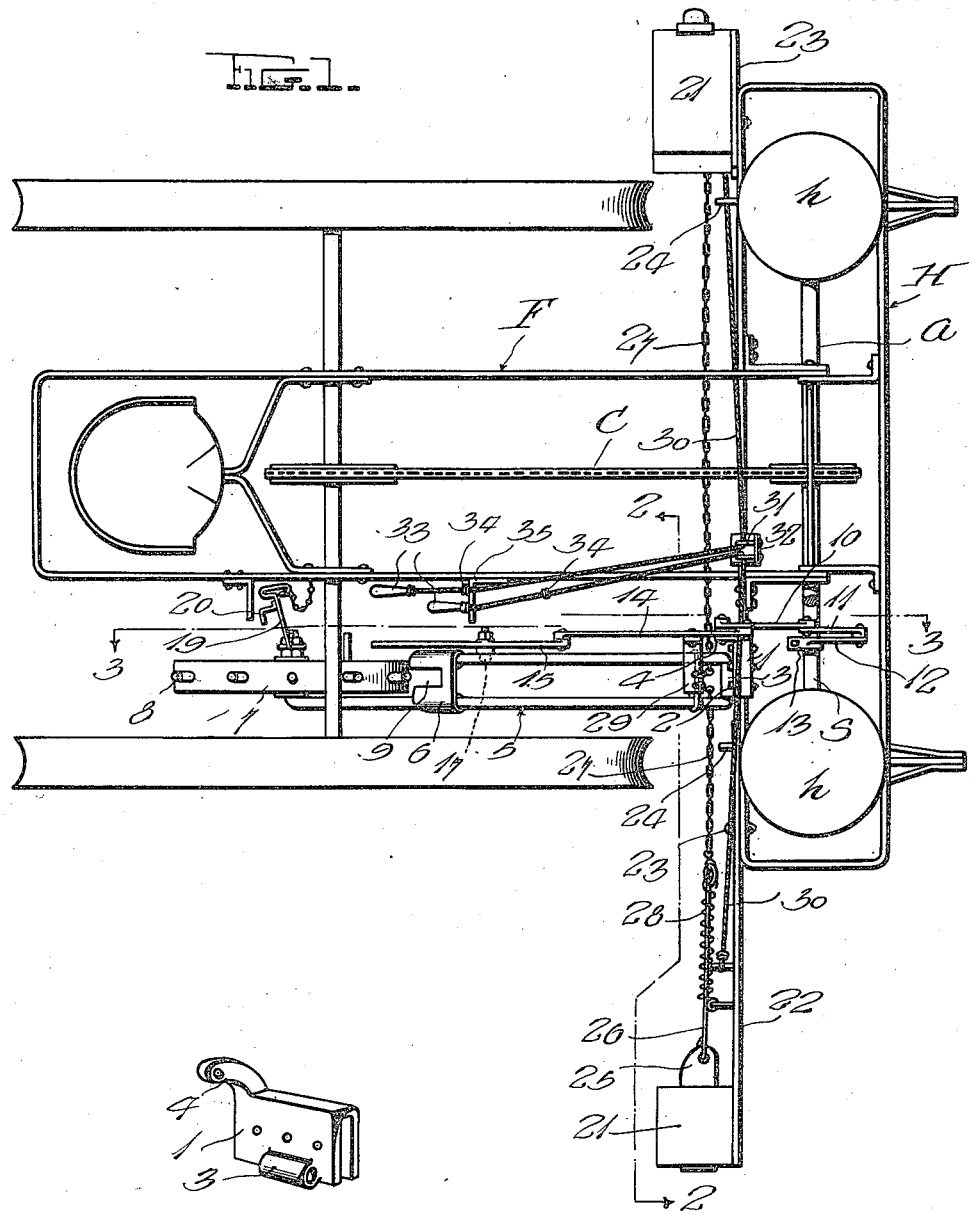
Witness
H. Woodard
Inventor
Frank A. Johnson
By H. B. Willson & Co.
Attorneys F. A. JOHNSON.
ATTACHMENT FOR CORN PLANTERS.
APPLICATION FILED OCT. 1, 1918.
1,301,134.
Patented Apr. 22, 1919.
2 SHEETS—SHEET 2.
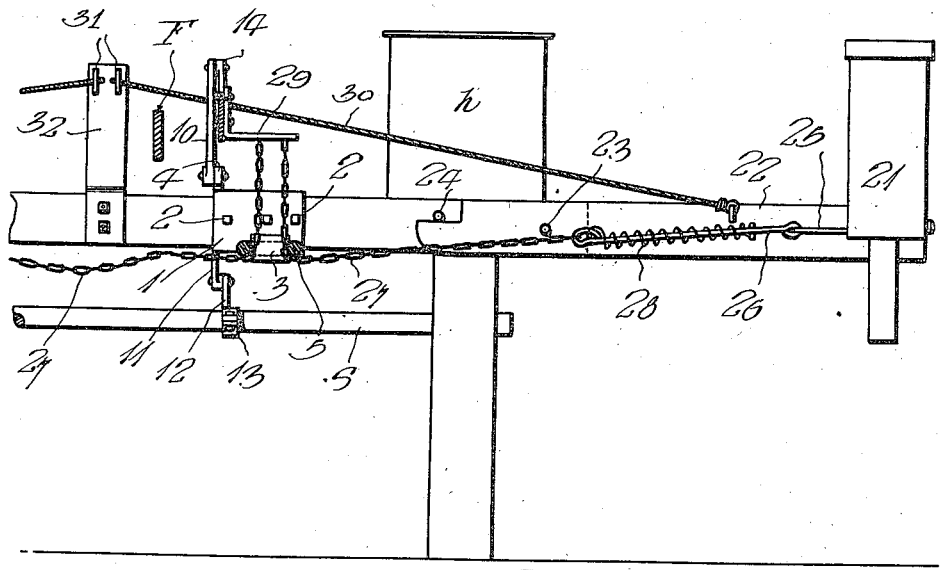
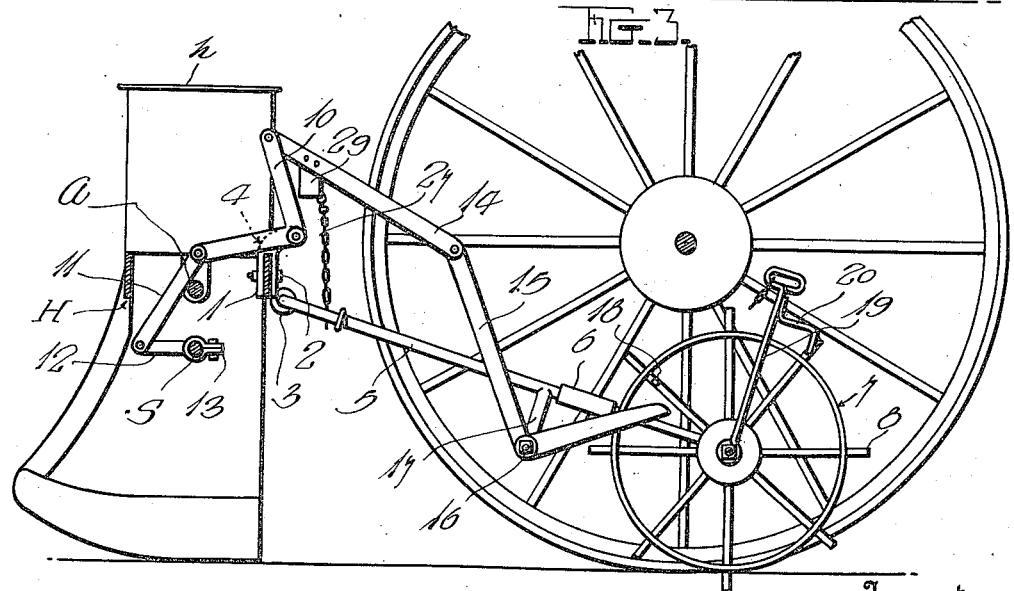
Witness
H. Woodard
Inventor
Frank A. Johnson
By H. B. Willson & Co.
Attorneys

UNITED STATES PATENT OFFICE.

FRANK A. JOHNSON, OF DANVILLE, ILLINOIS, ASSIGNOR OF ONE-HALF TO WILLIAM J. FREEMAN, OF DANVILLE, ILLINOIS.

ATTACHMENT FOR CORN-PLANTERS.

1,301,134.  Specification of Letters Patent.  Patented Apr. 22, 1919.

Application filed October 1, 1918. Serial No. 256,417.

*To all whom it may concern:*

Be it known that I, FRANK A. JOHNSON, a citizen of the United States, residing at Danville, in the county of Vermilion and State of Illinois, have invented certain new and useful Improvements in Attachments for Corn-Planters; and I do declare the following to be a full, clear, and exact description of the invention, such as will enable others skilled in the art to which it appertains to make and use the same.

My invention relates to agricultural implements and has for its object to provide a simple and inexpensive, yet a highly efficient and reliable attachment for corn planters, which will render the use of the usual check wire unnecessary, and in this connection, a further object is to provide such mounting means as will permit the rows of corn to be checked or alined both longitudinally and transversely of the field.

With the foregoing objects in view, the invention resides in the novel features of construction and unique arrangements of parts hereinafter fully described and claimed, and illustrated in the accompanying drawings.

Figure 1 is a top plan view of a common type of corn planter equipped with the present invention, one marker being raised and the other lowered.

Fig. 2 is a transverse section on the plane indicated by the line 2—2 of Fig. 1.

Fig. 3 is a longitudinal section as indicated by the line 3—3 of Fig. 1.

Fig. 4 is a perspective view of the attaching member by means of which the arm which carries the trailing operating wheel, is connected to the hopper frame.

In the drawings above briefly described, F designates the main frame of a corn planter, H has reference to the hopper frame at the front end of the main frame, $h$ indicates the hoppers on the frame H, having the usual or any preferred seed dropping means operated by a rock shaft S. The agitating means for insuring the proper feeding of the seed to the droppers, are operated by a transverse shaft A driven by a sprocket chain C from the axle of the machine. All of these parts are of common construction and form no part of the present invention.

An arched attaching member 1 straddles the rear bar of the hopper frame H and is secured thereto by bolts or the like 2, the rear arm of said attaching member having on its lower end a transverse knuckle 3, while a rearwardly extending lug 4 is formed on the crown of said attaching member. By means of the knuckle 3, a longitudinal arm 5 is pivotally mounted at its front end, said arm being preferably formed of a single metal rod passed through the knuckle 3 with both of its ends extended rearwardly therefrom and tied together by a transverse plate 6, one reach of the arm 5 being extended rearwardly beyond the other and beyond the tie plate 6 and carrying a trailing wheel 7 which is preferably provided with earth-engaging calks 8. The tie plate 6 is so disposed as to form a scraper for the wheel 7 and is provided with a notch 9 through which the calks 8 pass. By this arrangement, it will be seen that the accumulation of earth upon the trailing wheel will be prevented.

A bell crank 10 is fulcrumed at its angle to the lug 4 and a link 11 depends from one end of said bell crank and is pivoted to a crank arm 12, this arm having suitable means such as the clamp 13 for securing it rigidly to the rock shaft S. From the other end of the bell crank 10, a link 14 extends rearwardly and is pivotally connected to one end of an additional bell crank 15, the latter being fulcrumed at 16 to a depending projection 17 on the arm 5. The end of the bell crank 15 remote from the link 14, is disposed in the path of a tappet 18 on the trailing wheel 7. It will thus be seen that upon each revolution of wheel 7, the tappet 18 will strike and actuate the lever 15 to similarly operate lever 10 by means of the link 14, said lever 10 then actuating the rock shaft S to drop the seed, through the provision of the link 11 and the crank arm 12. When the machine is to be driven along the field or from one place to another without dropping seed, the wheel 7 may be raised by means of a suitable hanger rod or the like 19 having a hook 20 for holding it in raised position.

Used in connection with the features above described, are two hoppers 21 adapted to carry some suitably colored powder to be dropped on the ground at the ends of the rows to form guides in starting the next rows and alining the hills both longitudinally and transversely of the field. The hoppers 21 are carried by the outer ends of lateral arms 22 which at 23 are pivoted to the ends of the hopper frame H. The arms 22 are normally raised, but when lowered at the ends of the rows, are limited in their downward movement by stop pins or the like 24, and due to the provision of the construction now to be described, the slide or other suitable valves 25 of the hoppers 21 are automatically opened upon lowering of the arms 22, when the last hills of corn are dropped.

A pair of flexible elements, each preferably consisting of a rod 26 and a chain 27, lead from the slide valves 25, said rods being connected to the valves and having returning springs 28, while the chains 27 pass under the two parallel reaches of the arm 5 and upwardly between said reaches, being connected at their free ends to an arm 29 extending laterally from the link 14. The flexible connections between the link in question and valve 25 are normally slack as indicated at the left of Fig. 2, that is when the arms 22 of the hopper 21 are raised. When, however, the arms are swung downwardly as shown at the right of Fig. 2, the chains are tightened and it thus follows that the upward movement of the link 14 when it is operated by the lever 15, will pull upon the tightened chain, thus opening the valve 25 and dropping a quantity of the marking powder. When the arms 22 are raised, the marking mechanism does not operate, and it will be understood that any preferred means may be employed for raising and lowering said arms. For illustrative purposes however I have shown cables 30 connected to the arms 22, passing through guides 31 on an arm 32 rising from the frame H, and then extending rearwardly into close proximity with the driver's seat, said cables being provided with handles 33 and with knots or other suitable stops 34 for engagement with a keeper 35 secured to and rising from the frame F. When one or the other of the handles 33 is pulled and the stop 34 engaged with the keeper 35, the arm 22 connected with the cable which was pulled, will be raised and held in raised position, whereas release of the stop from the keeper will permit the arm and its hopper to lower by gravity.

From the foregoing, taken in connection with the accompanying drawings, it will be obvious that I have provided an attachment for corn planters which may be quickly and easily applied to practically any type of machine. It will furthermore be clear that although the invention is of simple and inexpensive construction, it will be highly efficient and durable and in every way desirable, permitting the proper alining of the rows of corn without the use of the troublesome check wire commonly employed. Since probably the best results are obtained from the details shown and described, they may be followed, but within the scope of the invention as claimed, considerable latitude is allowed for making such changes as occasion may dictate.

I claim:

1. In an attachment for corn planters, an attaching member secured on the rear bar of the hopper frame, a rearwardly extending arm pivoted at its front end to said attaching member and having on its rear end a trailer wheel provided with a tappet, a bell crank lever fulcrumed on said arm with one end in position to be actuated by said tappet, a link extending forwardly from the other end of said bell crank, a relatively small bell crank fulcrumed on the aforesaid attaching member and having one end pivoted to said link, a second link pivoted to the other end of said relatively small bell crank and depending therefrom, and a crank arm to which said second link is pivoted, said crank arm being secured on the operating shaft of the seed dropping means.

2. An attachment for planters comprising an arm for longitudinal disposition and means for connecting it to the planter frame, a trailing wheel mounted on said arm and having a tappet, a bell crank mounted on said arm with one end in the path of said tappet, a link pivoted to and extending forwardly from the other end of said bell crank, a second bell crank to which said link is pivoted and means for mounting it on the planter frame, a second link depending from said second bell crank, a crank arm to which said second link is pivoted, and means for connecting said crank arm to the rock shaft for operating the seed dropping means of the planter; together with a pair of markers and means for mounting them on the planter frame for vertical movement, means for raising and lowering said markers, and a pair of flexible marker operating elements extending from said first named link to said markers, said flexible elements being normally slack but being tightened and brought into play by lowering of said markers.

3. An attachment for planters comprising an arm for longitudinal disposition and means for connecting it to the planter frame, a trailing wheel mounted on said arm and having a tappet, a bell crank mounted on said arm with one end in the path of said tappet, a link pivoted to and extending forwardly from the other end of said bell crank, a second bell crank to which said link is pivoted and means for mounting it on the planter frame, a second link depending from said second bell crank, a crank arm to which said link is pivoted, and means for connecting said crank arm to the rock shaft for operating the seed dropping means of the planter; the aforesaid arm having two longitudinal reaches disposed side by side, a pair of flexible elements passing under said reaches and upwardly between them to said first named link, the latter having upward movement to pull upon said elements, a pair of markers to which said flexible elements extend to operate the same, said elements being normally slack, and means for lowering said markers, such lowering serving to tighten said flexible elements and throw them into play.

4. An attachment for planters comprising an arched attaching member adapted to straddle a bar of the hopper frame, means for securing said attaching member to said bar, a knuckle on the rear arm of said attaching member and a lug on the crown of said member, an arm pivoted to said knuckle and a trailer wheel mounted on said arm, a lever fulcrumed to said lug, means to transmit motion from said lever to the seed droppers of the planter, and means for operating said lever from said wheel.

In testimony whereof I have hereunto set my hand.

FRANK A. JOHNSON.